US012190646B2

(12) United States Patent
Halbert

(10) Patent No.: US 12,190,646 B2
(45) Date of Patent: Jan. 7, 2025

(54) REMOTE MAINTENANCE OF MEDICAL DEVICES

(71) Applicant: CareFusion 303, Inc., San Diego, CA (US)

(72) Inventor: Donald Halbert, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 17/061,985

(22) Filed: Oct. 2, 2020

(65) Prior Publication Data

US 2021/0174605 A1 Jun. 10, 2021

Related U.S. Application Data

(63) Continuation of application No. 14/256,663, filed on Apr. 18, 2014, now Pat. No. 10,832,495.

(51) Int. Cl.
*G07C 3/00* (2006.01)

(52) U.S. Cl.
CPC ..................................... *G07C 3/00* (2013.01)

(58) Field of Classification Search
None
See application file for complete search history.

(56) References Cited

U.S. PATENT DOCUMENTS

| | | | | |
|---|---|---|---|---|
| 5,431,509 | A * | 7/1995 | Anderson | A61M 5/1413 403/381 |
| 6,442,433 | B1 | 8/2002 | Linberg | |
| 6,665,565 | B1 | 12/2003 | Stomberg et al. | |
| 6,675,131 | B2 | 1/2004 | Hahn | |

(Continued)

FOREIGN PATENT DOCUMENTS

| | | | |
|---|---|---|---|
| EP | 2124720 | A2 | 12/2009 |
| EP | 1115435 | B2 | 7/2012 |

OTHER PUBLICATIONS

Asare, Philip, et al. "Demo of the Medical Device Dongle: An Open-Source Standards-Based Platform for Interoperable Medical Device Connectivity." WH '11 Proceedings of the 2nd Conference on Wireless Health. New York City: ACM, 2011. 2 pages.

Jones, Kent, et al. "A Protocol for Automatic Sensor Detection and Identification in a Wireless Biodevice Network." Computer-based Medical Systems Proceedings : 11th IEEE Symposium on Computer-Based Medical Systems : Jun. 12-14, 1998, Lubbock, Texas, USA. Los Alamitos, Calif.: IEEE Computer Society, 1998. 6 pages.

(Continued)

*Primary Examiner* — Brent A. Fairbanks

(74) *Attorney, Agent, or Firm* — Mintz Levin Cohn Ferris Glovsky and Popeo, P.C.

(57) ABSTRACT

The subject matter disclosed herein provides methods for conducting tests on a medical device. A request to conduct a test on a medical device module remotely located from a party initiating the request can be received. The module can have an inductive receiver and be part of a medical device system having an inductive backplane and multiple mounting seats. Each mounting seat can have an inductive transmitter, and the module can be inductively powered when affixed to a first mounting seat. The test can relate to an attribute of the first mounting seat's inductive transmitter or the module's inductive receiver. The request can identify the module and test to conducted. A message representative of the request can be transmitted to the system. Test data relating to an attribute of the inductive transmitter or inductive receiver can be received and provided. Related methods, apparatus, systems, techniques and articles are also described.

19 Claims, 7 Drawing Sheets

(56) References Cited

U.S. PATENT DOCUMENTS 6,957,102 B2 10/2005 Silver et al.
7,884,735 B2 * 2/2011 Newkirk ............. A61M 5/1413 340/691.6
8,234,128 B2 7/2012 Martucci et al.
8,286,088 B2 10/2012 Shaffer et al.
8,344,847 B2 1/2013 Moberg et al.
2003/0025602 A1 * 2/2003 Medema ................ G16H 40/20 340/568.1
2005/0033124 A1 * 2/2005 Kelly ..................... G16H 40/67 600/300
2005/0133027 A1 * 6/2005 Elaz ....................... G16H 40/67 128/200.24
2005/0234407 A1 * 10/2005 Spohn ................... A61M 39/10 604/122
2006/0214777 A1 9/2006 Schmitt
2009/0158274 A1 6/2009 Roberts
2009/0270810 A1 * 10/2009 DeBelser .............. A61M 5/142 604/151
2011/0131057 A1 6/2011 Newkirk
2011/0185035 A1 7/2011 Van
2012/0029304 A1 * 2/2012 Medina .............. A61B 5/02055 600/300
2012/0139355 A1 * 6/2012 Ganem ................... H02J 5/005 307/104
2013/0047113 A1 2/2013 Hume et al.
2013/0049484 A1 * 2/2013 Weissentern ............ H02J 50/40 307/104
2013/0150824 A1 * 6/2013 Estes ................. A61M 5/14244 604/151
2013/0324929 A1 * 12/2013 Mochizuki ............. G16H 40/40 604/151
2014/0259837 A1 9/2014 Belliveau et al.
2014/0271246 A1 9/2014 Zollinger et al.
2014/0271247 A1 9/2014 Abal
2014/0276424 A1 9/2014 Davis et al.
2014/0276425 A1 9/2014 Zollinger et al.
2014/0276533 A1 9/2014 Butterfield et al.
2014/0276553 A1 * 9/2014 Rosinko ............ A61M 5/14216 604/504
2014/0321096 A1 * 10/2014 Kajackas ............ A61M 5/1415 361/807
2015/0154369 A1 * 6/2015 Blomquist .............. H04L 67/12 705/2
2015/0351847 A1 * 12/2015 Couillaud ............. H04L 61/609 709/245
2017/0246380 A1 * 8/2017 Rosinko ............ A61M 5/14244

OTHER PUBLICATIONS

Khan, Ijaz, et al. "An Overview of the Impact of Wireless Sensor Networks in Medical Health Care." 2012 International Conference on Communications and Information Technology (ICCIT). Piscataway, N.J.: IEEE, 2012. 5 pages.
King, Andrew, et al. "A Publish-Subscribe Architecture and Component-based Programming Model for Medical Device Interoperability." ACM SIGBED Review—Special Issue on the 2nd Joint Workshop on High Confidence Medical Devices, Software, and Systems (HCMDSS) and Medical Device Plug-and-Play (MD PnP) Interoperability 6.2. (2009). 10 pages.

* cited by examiner

REMOTE MAINTENANCE OF MEDICAL DEVICES

CROSS REFERENCE TO RELATED APPLICATION

This application is a continuation of U.S. application Ser. No. 14/256,663 filed on Apr. 18, 2014, now issued as U.S. Pat. No. 10,832,495, and entitled "Remote Maintenance of Medical Devices," the disclosure of which is incorporated herein by reference in its entirety.

TECHNICAL FIELD

The subject matter described herein relates to a modular medical device system having one or more medical device modules and, more particularly, to the remote testing of the medical device modules.

BACKGROUND

Medical device systems may utilize a plurality of different medical devices that are distinct stand-alone or independent medical devices. For example, some conventional infusion pumping systems may include up to about four functionally distinct stand-alone infusion pumps. Conventional infusion pumps are typically stand-alone complex devices that are only able to provide independent complex infusion functions. As such, coordination or control of the devices collectively is complex and difficult.

This difficulty extends to the powering of each stand-alone device. A device requires a sufficient amount of power in order to operate properly. Whether the amount of received power is adequate can depend on many factors including, for example, the power supply, the stand-alone device, and the link between the power supply and the stand-alone device. In order to ensure that each component is operating properly, these components may be subject to regular inspection and testing.

SUMMARY

In some implementations, methods and apparatus, including computer program products, and systems are provided for conducting maintenance tests on a medical device across a network from a remote location using a remote maintenance application.

In one aspect, a request to conduct at least one test on a medical device module remotely located from a party initiating the request is received by at least one processor. The medical device module includes an inductive receiver and is part of a medical device system. The medical device system includes an inductive backplane having a plurality of mounting seats. Each mounting seat has an inductive transmitter. The inductive backplane is configured to inductively power the medical device module when the medical device module is affixed to a first mounting seat. The at least one test relates to at least one attribute of the inductive transmitter of the first mounting seat or the inductive receiver of the medical device module. The request identifies the medical device module to be tested and the at least one test to be conducted. A message representative of the request is transmitted to the medical device system by the at least one processor. Test data based on the one or more tests is received by the at least one processor. The test data relates to the at least one attribute of the inductive transmitter of the first mounting seat or the at least one attribute of the inductive receiver of the medical device module. The test data is provided by the at least one processor.

The above methods, apparatus, computer program products, and systems can, in some implementations, further include one or more of the following features.

The test data can be provided by performing at least one of transmitting the test data, loading the test data, storing the test data, and displaying the test data.

An indication that the medical device module is not currently being used to treat a patient can be received by the at least one processor before the message is transmitted.

The at least one attribute of the inductive transmitter of the first mounting seat and the inductive receiver of the medical device module can include at least a link efficiency, an input voltage, an input current, an output power, and a temperature.

Authentication information can be received by the at least one processor from the party initiating the request. The authentication information can include at least a role of the party. The identity of the party can be authenticated by the at least one processor before the message is transmitted. The contents of the provided test data can be based on the role of the party initiating the request.

The message can indicate that the at least one test is automatically conducted by the medical device system or requires user intervention.

A second request can be received by the at least one processor to conduct additional tests on the medical device module in the first mounting seat after the test data is provided. A message representative of the second request can be transmitted by the at least one processor to the medical device system.

The medical device module can be an infusion pump selected from a group consisting of syringe pumps, patient controlled infusion pumps, large volume infusion pumps, and peristaltic pumps.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter allows a user to remotely conduct maintenance tests on a medical device across a network. A user can utilize a remote maintenance application to specify the tests to be conducted, receive the corresponding test data, and analyze the test data.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

Figure 1:
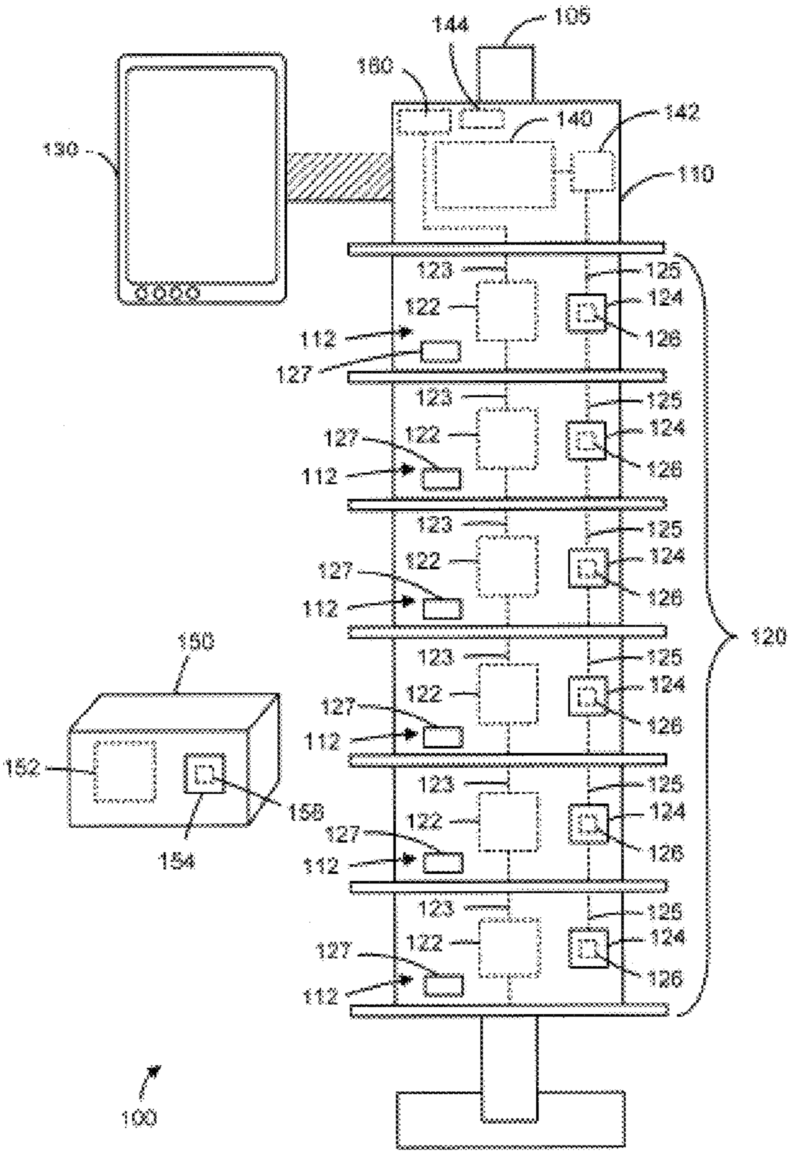
FIG. 1 is a diagram illustrating a modular medical device system.

FIG. 1 is a diagram 100 illustrating a modular medical device system 110. The system 110 comprises a backplane 120 that can be mounted on a pole 105. The backplane 120 can mechanically couple to and secure one or more medical device modules 150 along each of a series of pre-defined mounting seats 112. In some variations, each of the mounting seats 112 are uniform in size and spacing, while in other variations different sizing and/or spacing can be used to accommodate medical device modules 150 having different exterior dimensions. In addition, the mounting seats 112 can be arranged along a single axis (e.g., a vertical axis as illustrated, etc.) or they can be arranged along two or more axes. The mounting seats 112 can each have one or more mechanical elements to detachably affix the medical device modules 150 to the backplane 120.

In addition to allowing the medical device modules to be affixed to the system, the backplane 120 can provide non-contact inductive power to one or more medical device modules 150. The backplane 120 can, for each mounting location, comprise an inductive transmitter 122 for non-contact powering of a medical device module 150. A corresponding inductive receiver 152 on the medical device module 150 can, when the medical device module 150 is affixed to the mounting seat 112, be inductively coupled with inductive transmitter 122 of backplane 120. In general, energy is sent via an inductive (magnetic) coupling between inductive transmitter 122 and inductive receiver 152. As a result, there is a wireless (no galvanic contact) energy transfer between inductive backplane 120 and medical device module 150. Moreover, an electrical galvanic connector, as is typical for powering conventional medical devices, is not required to provide power to medical device module 150. Use of non-contacting energy transfer avoids metallic contacts between medical device module 150 and a power source which may be damaged, require special cleaning and pose risk of electrical heating, smoke or fire. Each inductive transmitter 122 can be coupled to an induction bus 123 which in turn is connected to a power source 160 (e.g., a wired connection to an outlet, a battery, etc.) to enable the inductive coupling of each inductive transmitter 122.

The backplane 120 can also provide an optical communications interface to one or more medical device modules 150 via respective optical communications ports 124 and optical transceivers 126 corresponding to each mounting seat 112. The medical device modules 150 can have corresponding optical communications ports 154 and optical transceiver 156 which can be optically aligned with the optical communication port 124 on the backplane 120 when the medical device module 150 is affixed to the backplane 120 so that a bi-directional data feed can be established between the optical transceivers 126, 156. Such data can relate to a variety of aspects including, but not limited to, data characterizing operation of the medical device module 150, data for controlling (e.g., modifying, monitoring, etc.) one more attributes of the medical device module 150 (e.g., software updates, configuration updates, asset locations, status information, historical data, patient information, patient treatment parameters, medication administration information, etc.), and the like. Stated differently, the data exchanged via the optical transceivers 126, 156 can comprise any data generated or otherwise used by a medical device module 150 or a caregiver using same. The data transmitted to the backplane 120 can be consumed locally by the system 110 and/or it can be transmitted to one or more remote systems/devices coupled to the system 110 via a wired or wireless communications link. The optical data transceivers 126, 156 can be infrared (IR) data transceivers such that optical data 146 is propagated by IR light as the transmission medium. The optical data transceivers can be coupled to a communications bus 125 that in turn is coupled to a communications interface 142. The communications interface 142 can, in turn, be coupled to the control unit 140. In addition or in the alternative, a second communications interface 144 can provide an outward interface for the modular medical device system 110 that provides a wired or wireless connection to other devices and/or networks. It will be appreciated that any number of communications interfaces can be used, including one communications interface for each optical data transceiver 126/seat 112.

The control unit 140 can be hardware, software, or a combination of both. For example, the control unit 140 can be a specially designed hardware module including at least one data and memory with specialized software used to control any aspect of a medical device module 150 coupled to the system 110. In other cases, the control unit 140 can be a software module (or series of modules) used to control any aspect of a medical device module 150 coupled to the system 110. As used herein, unless otherwise specified, the term control shall relate to any type of data exchange with a medical device module 150 by the control unit 140 including data generated by a medical device module 150 and data used by a medical device module 150 (software updates, power state changes, etc.). For example, the control unit 140 can be used to selectively wake up medical device modules 150 coupled to the inductive backplane 120 from a sleep state. Furthermore, the control unit 140 can be coupled to one or more remote computing systems (via the communications interface 144) to allow for the remote control of the medical device modules 150.

Each mounting seat 112 can include a shelf with dove tail features extending from a housing of the system 110. Each medical device module 150 can include a latch mechanism on a top rear edge that affixes to the housing of the system 110. The latch mechanism can reduce load on the shelf and can cause the medical device module 150 to rotate back into contact with the system 110 under load (rather than deflect away from it). This arrangement can help insure that the inductive transmitter 122 is positioned properly and secured in relation to the inductive receiver 152.

Each mounting seat 112 can include a proximity sensor 127 that can detect the presence of a medical device module 150. The proximity sensors 127 can be optical, electric, electro-mechanical, and/or mechanical devices. For example, the proximity sensors 127 can comprise a Hall effect sensor, an optical proximity sensor, and/or a mechanical switch. The presence of a medical device module 150 can be used to initiate, for example, inductive powering by the corresponding inductive transmitter 122 and/or communications via the communications interface 142. The proximity sensor 127 can also indicate an alarm condition when a medical device module 150 is not completely secured so that appropriate actions can be taken.

Medical device module 150 can be any medical device that is compatible for scalability in a modular medical device system. For instance, the modular medical device system 110 can utilize one or more medical device modules 150 depending on the functionality that is needed for proper care of a patient. Moreover, a modular medical device system 110 can be scaled up to incorporate additional medical device modules 150 and also scaled down by removing medical device modules 150.

For example, if patient care requires only one infusion pump, then the modular medical device system 110 can include a single affixed infusion pump. Moreover, if patient care requires two infusion pumps, then the modular medical device system 110 can be scaled up to include an affixed additional infusion pump.

Medical device modules 150 can include, but is not limited to, an infusion pump (e.g., a large volume pump (LVP), a syringe pump), a peristaltic pump, a patient-controlled analgesia (PCA) system, a vital signs monitor (VSM) (e.g., an SpO2 sensor, an EtCO2 sensors, cardiac output monitors, gastric tonometers, etc.), a bedside blood analyte analyzer (e.g. blood glucose), an Auto-ID module (barcode scanner and RFID), and other devices which measure physiological parameters associated with a patient and/or assist with the clinical care of the patient (and such medical device modules 150 may not necessarily measure physiological parameters of the patient).

Modular medical device system 110 can also comprise a display unit 130 that provides a unified interface that characterizes the operation of various medical device modules 150 coupled to the backplane 120. The display unit 130 can comprise a touch screen interface that allows a user to selectively view and alter performance parameters/metrics of individual medical device modules 150, concurrently view performance parameters/metrics of multiple medical device modules 150, and additionally orchestrate complex sequences of infusions/operations from multiple medical device modules 150. The display unit 130 can be affixed to an outer housing of the modular medical device system 130/inductive backplane 120 by a tilt and swivel arm mount that allows the display unit to be moved on different sides of the system 110 and/or to change varying positions (to accommodate different positions/heights of caregivers).

The display unit 130 can include a speaker to provide audio cues relating to various aspects of medical device modules 150 (in other versions the speaker is located elsewhere in the system 110). When the medical device modules 150 are coupled to the backplane 120, audio cues such as alarms for such medical device modules 150 can be delegated so that the system 110 handles the alarms whether via an audio and/or visual cue in the display unit 130 or by an audio cue generated elsewhere in the system 110. In some cases, some alarms can be still be handled by a medical device module 150 while other alarms are handled by the system 110.

Figure 2:
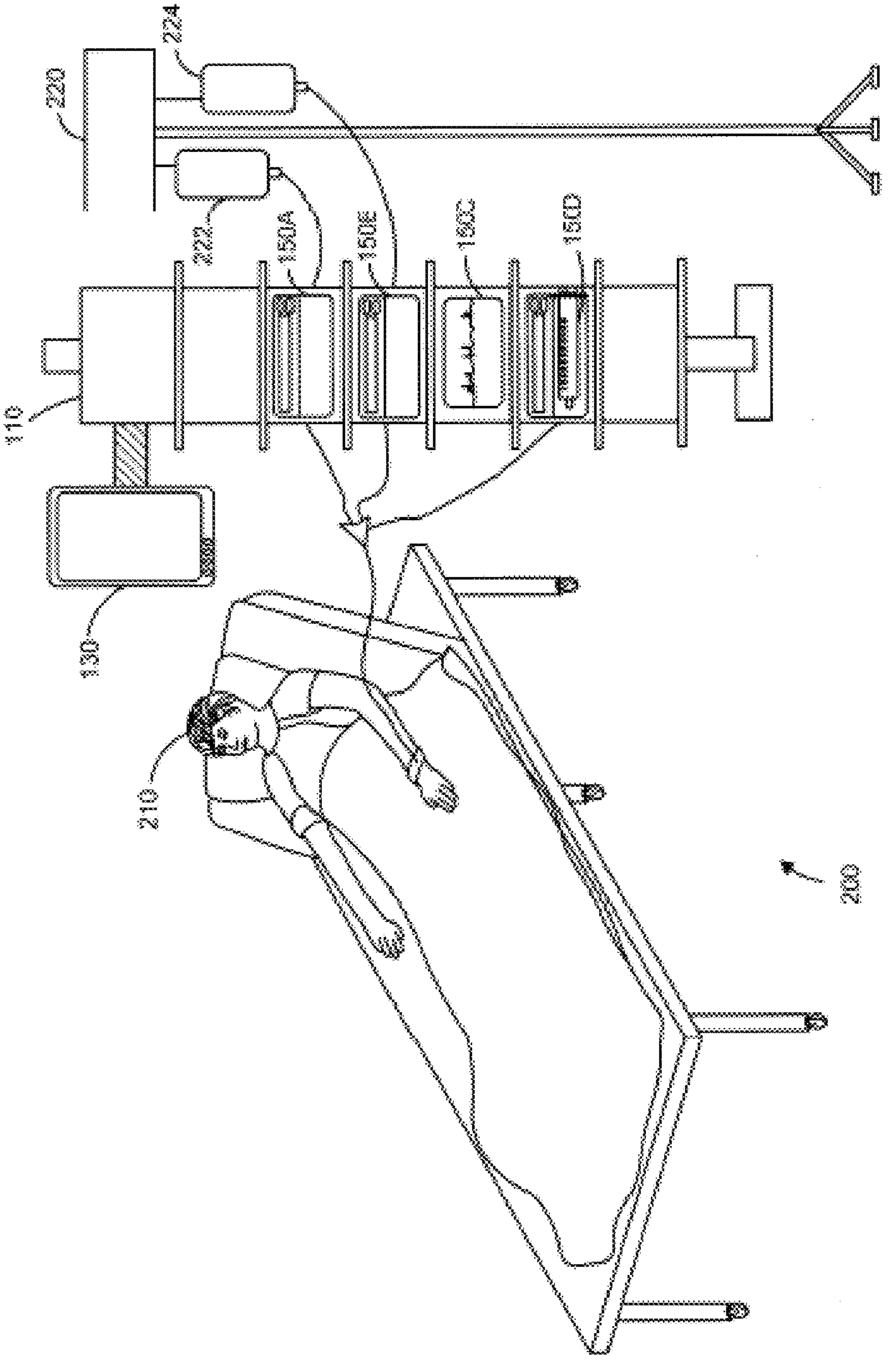
FIG. 2 is a diagram illustrating a modular medical device system in a clinical setting.

FIG. 2 is a diagram 200 illustrating a modular medical device system 110 in a clinical setting. In particular, in this view, the modular medical device system 110 is coupled to two infusion pumps 150A, 150B, a vital signs monitor 150C, and a syringe pump 150D. The infusion pumps 150A and 150B are respectively fluidically coupled to two fluid/medication containers 222, 224 suspended from an IV pole 220. In addition, each of the infusion pumps 150A and 150B and the syringe pump 150D are fluidically coupled to an IV catheter inserted into a patient 210 so that the corresponding fluids can be delivered to the patient. The modular medical device system 110 monitors and/or controls how fluids from the respective sources 150A, 150B, 150D are delivered to the patient 210. It will be appreciated that varying numbers of medical device modules 150 can be utilized depending on the particular condition of and/or treatment the patient 210.

Figure 3:
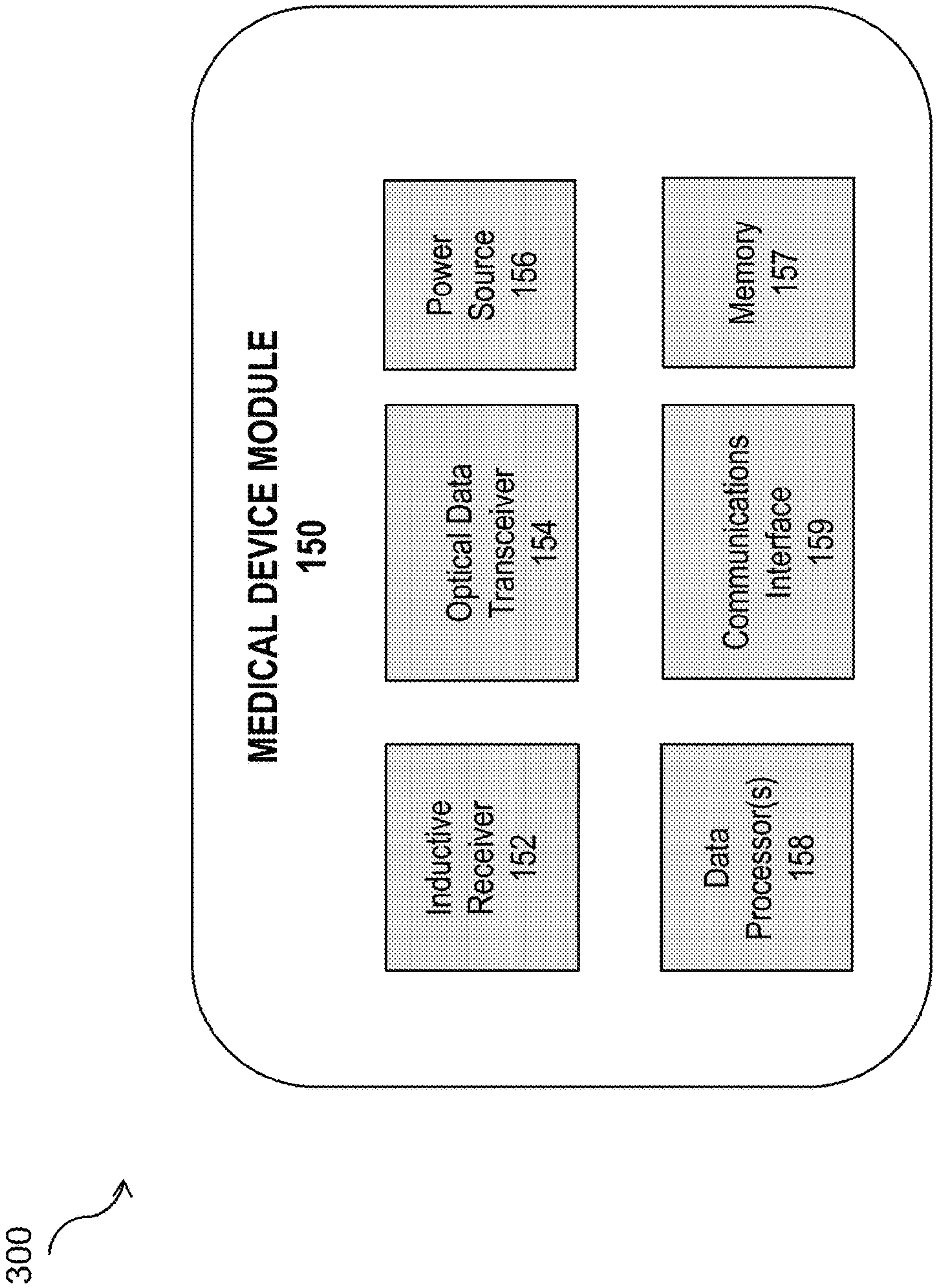
FIG. 3 is a logic diagram illustrating a medical device module.

FIG. 3 is a logic diagram 300 of a medical device module 150. With FIG. 3, each medical device module 150 can include a secondary power source 156 such as a battery or a wired connection to an external power source. For example, the secondary power source 156 can power medical device module 150 when inductive receiver 152 is unable to power medical device module 150. In one scenario, medical device module 150 is an infusion pump that is associated with (and fluidly communicating with) a patient. If the patient is moved to another location (e.g., to an x-ray room which is away from inductive backplane 110), then medical device module 150 must also move with the patient away from inductive backplane 120 in order to continue the current infusion without interruption. Upon a certain distance from inductive backplane 120, inductive receiver 152 cannot be energized by inductive backplane 120 and therefore cannot power medical device module 150. In other cases, the inductive backplane 120 may be turned off or operating in a mode not allowing the inductive receiver 152 to be energized. Accordingly, power source 156 (which may also be charged through inductive receiver 152) is able to provide the requisite power for medical device module 150. In one variation, the power source 156 is a battery that can keep medical device module 150 operational in a range of about two to four hours.

Each medical device module 150 can also include memory 157 and at least one data processor 158. The memory 157 can store instructions for execution by the at least one data processor 158 for use, for example, in the operation of the medical device module in a clinical setting. The memory 157 can also store data relating to the operation of the medical device module such as data characterizing how the medical device module 150 is used and parameters relating to same (e.g., number of hours operated, thresholds for alerts, etc.), performance and status information, and well as other aspects relating to the use of such medical device module 150 such as patient data, medication administration data, patient treatment parameters, etc. It is noted that when a medical device module 150 is reattached to the prior inductive backplane or a different inductive backplane, information required to continue the infusion stored in memory 157, without interruption, can be transmitted from the medical device module 150 to the backplane (and to the control unit 140).

Each medical device module 150 can also comprise an additional communications interface 159 other than the optical data transceiver 154. In some implementations the optical data transceiver 154 may not form part of the medical device module 150. In these implementations, the communications interface 159 may be the only gateway for communication outside of the medical device module 150). This communications interface 159 can be fixed and/or wireless and be used to communicate to computer networks and peer-to-peer pairing with other devices when the medical device module 150 is not coupled to the backplane 120.

In some implementations, the communications interface 159 can be used in addition or instead of the optical data transceiver 154 when the medical device module 150 is coupled to the backplane 120. For example, the medical device module 150 can be seated on the backplane 120 but not have an optical data transceiver. In such a scenario, the communications interface 159 can wirelessly communicate with the control unit 140 of the modular medical device system 110 so that the operation of the medical device module 150 can be monitored and/or controlled by the modular medical device system 110 (whether or not the medical device module 150 is seated). Various types of wireless communications can be used (for this and other aspects described herein) such as short distance protocols such as BLUETOOTH, near field communication (NFC), WiFi, ZIGBEE, and the like.

As noted above, the system 110 comprises a control unit 140 (which in turn can comprise at least one data processor and memory for storing instructions for execution by the at least one data processor and/or data characterizing or otherwise relating to the operation of medication device modules 150). The control unit 140 can act to individually monitor and/or control the operation of the medical device modules 150 affixed to the backplane 120 such that the functionality of the medical device modules 150, alone and/or in combination are increased. In some cases, the control unit 140 can orchestrate the operation of multiple medical device modules 150. For example, certain sequences of operation and/or concurrent operation can be defined amongst the medical device modules 150. Such an arrangement can permit, for example, coordinated infusion from different fluid sources. Some medical device modules 150 can have the ability to function fully independent of the control unit 140 for the purpose of basic operations. However, the modules acquire more complex abilities and functionality when operating under the command and coordination of the controller.

Figure 4:
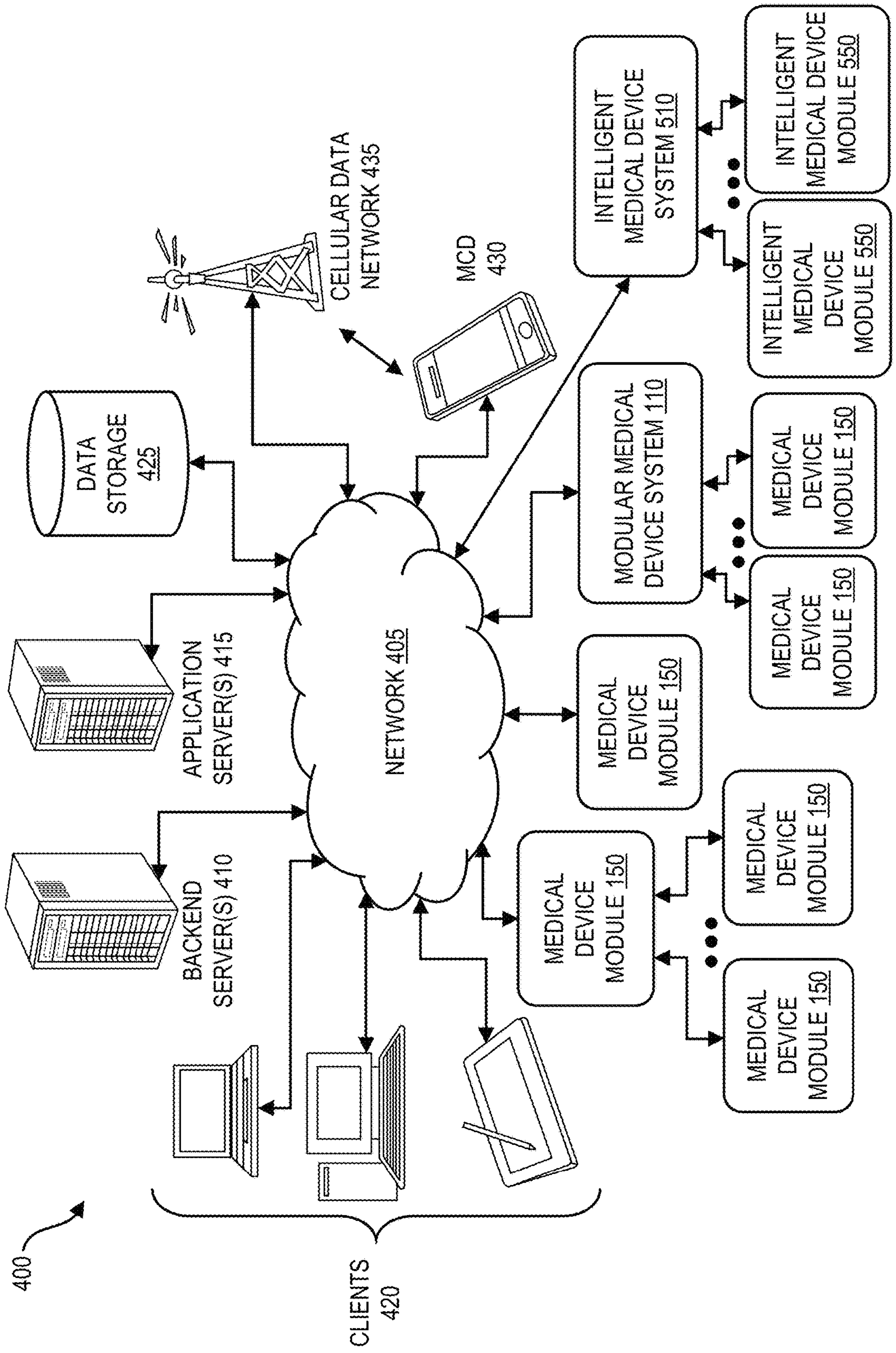
FIG. 4 is a diagram illustrating a computing landscape including a modular medical device system.

FIG. 4 is a system diagram illustrating a computing landscape 400 within a healthcare environment such as a hospital that includes modular medical device system 110. Various devices and systems, both local to the healthcare environment and remote from the healthcare environment, can interact via at least one computing network 405. This computing network 405 can provide any form or medium of digital communication connectivity (i.e., wired or wireless) amongst the various devices and systems. Examples of communication networks include a local area network ("LAN"), a wide area network ("WAN"), and the Internet. In some cases, one or more of the various devices and systems can interact directly via peer-to-peer coupling (either via a hardwired connection or via a wireless protocol such as Bluetooth or WiFi). In addition, in some variations, one or more of the devices and systems communicate via a cellular data network 435.

The modular medical device systems 110 can include at least one communications interface that can access the computing network 405 either via a fixed wired connection or via a wireless connection (via, for example, one or more access points). In addition, the modular medical device system 110 can also couple to other components within the computing landscape 400 via direct wired or wireless peer-to-peer coupling (not shown). Furthermore, in some cases, one or more of the modular medical device system 110 can be self-contained and is not connected to any other devices or networks. The modular medical device system 110 can transmit data via the computing network 405 to any of the other components within the landscape 400 that characterizes the medical device modules 150. In addition, the modular medical device system 110 can receive data from the computing network 405 relating to monitoring and in some cases controlling one or more attributes of the medical device modules 150 (e.g., software updates, configuration updates, historical data, status information, assets location, patient information, etc.).

In particular, aspects of the computing landscape 400 can be implemented in a computing system that includes a back-end component (e.g., as a data server 410), or that includes a middleware component (e.g., an application server 415), or that includes a front-end component (e.g., a client computer 420 having a graphical user interface or a Web browser through which a user may interact with an implementation of the subject matter described herein), or any combination of such back-end, middleware, or front-end components. A client 420 and servers 410, 415 are generally remote from each other and typically interact through the communications network 405. The relationship of the clients 420 and servers 410, 415 arises by virtue of computer programs running on the respective computers and having a client-server relationship to each other. Clients 420 can be any of a variety of computing platforms that include local applications for providing various functionality within the healthcare environment. Example clients 420 include, but are not limited to, desktop computers, laptop computers, tablets, and other computers with touch-screen interfaces. The local applications can be self-contained in that they do not require network connectivity and/or they can interact with one or more of the servers 410, 415 (e.g., a web browser).

A variety of applications can be executed on the various devices and systems within the computing landscape such as electronic health record applications, medical device monitoring, operation, and maintenance applications, scheduling applications, billing applications and the like. As another example, the applications can comprise a collection of enterprise-based applications that provide dose error reduction software (DERS) for the modular medical device system 110 incorporates a role-based view of infusion data, provides a comprehensive platform for connectivity to external hospital applications, and enables directed maintenance and calibration activities for devices, storage of clinical and device history, etc. As a further example, the applications can provide for remote alarms management and/or asset tracking for medical device modules 150 coupled to one or more of the modular medical device system 110.

The network 405 can be coupled to one or more data storage systems 425. The data storage systems 425 can include databases providing physical data storage within the healthcare environment or within a dedicated facility. In addition, or in the alternative, the data storage systems 425 can include cloud-based systems providing remote storage of data in, for example, a multi-tenant computing environment. The data storage systems 425 can also comprise non-transitory computer readable media.

Mobile communications devices (MCDs) 430 can also form part of the computing landscape 400. The MCDs 430 can communicate directly via the network 405 and/or they can communicate with the network 405 via an intermediate network such as a cellular data network 435. Various types of communication protocols can be used by the MCDs 430 including, for example, messaging protocols such as SMS and MMS. In some cases, the MCDs 430 can receive alerts generated from the operation of the medical device modules 150 coupled to the backplane 120 and/or they can otherwise be used to monitor the operation of such medical device modules 150.

Various types of medical device modules 150 can be used as part of the computing landscape 400. These medical device modules 150 can comprise, unless otherwise specified, any type of device or system with a communications interface that characterizes one or more physiological measurements of a patient and/or that characterize or are used for the treatment of a patient. In some cases, the medical device modules 150 communicate via peer to peer wired or wireless communications with another medical device module 150 (as opposed to communicating with the network 405). For example, the medical device modules 150 can comprise a bedside vital signs monitor that is connected to other medical device modules 150 (and/or the modular medical device system 110), namely a wireless pulse oximeter and to a wired blood pressure monitor. One or more attributes of the medical device modules 150 can be locally controlled by a clinician, controlled via a clinician via the network 405, and/or they can be controlled by one or more of a server 410, 415, a client 420, a MCD 430, and/or another medical device module 150, or the modular medical device system 110.

The computing landscape 400 can provide various types of functionality as may be required within a healthcare environment such as a hospital. For example, a pharmacy can initiate a prescription via one of the client computers 420. This prescription can be stored in the data storage 425 and/or pushed out to other clients 420, an MCD 430, and/or one or more of the medical device modules 150 forming part of the modular medical device system 110. In addition, the medical device modules 150 and the modular medical device system 110 can provide data characterizing one or more physiological measurements of a patient and/or treatment of a patient (e.g., medical device module 150 can be an infusion management system, etc.). The data generated by the modular medical device system 110 and the medical devices 150 can be communicated to other medical device module 150, the servers 410, 415, the clients 420, the MCDs 430, and/or stored in the data storage systems 425.

Figure 5:
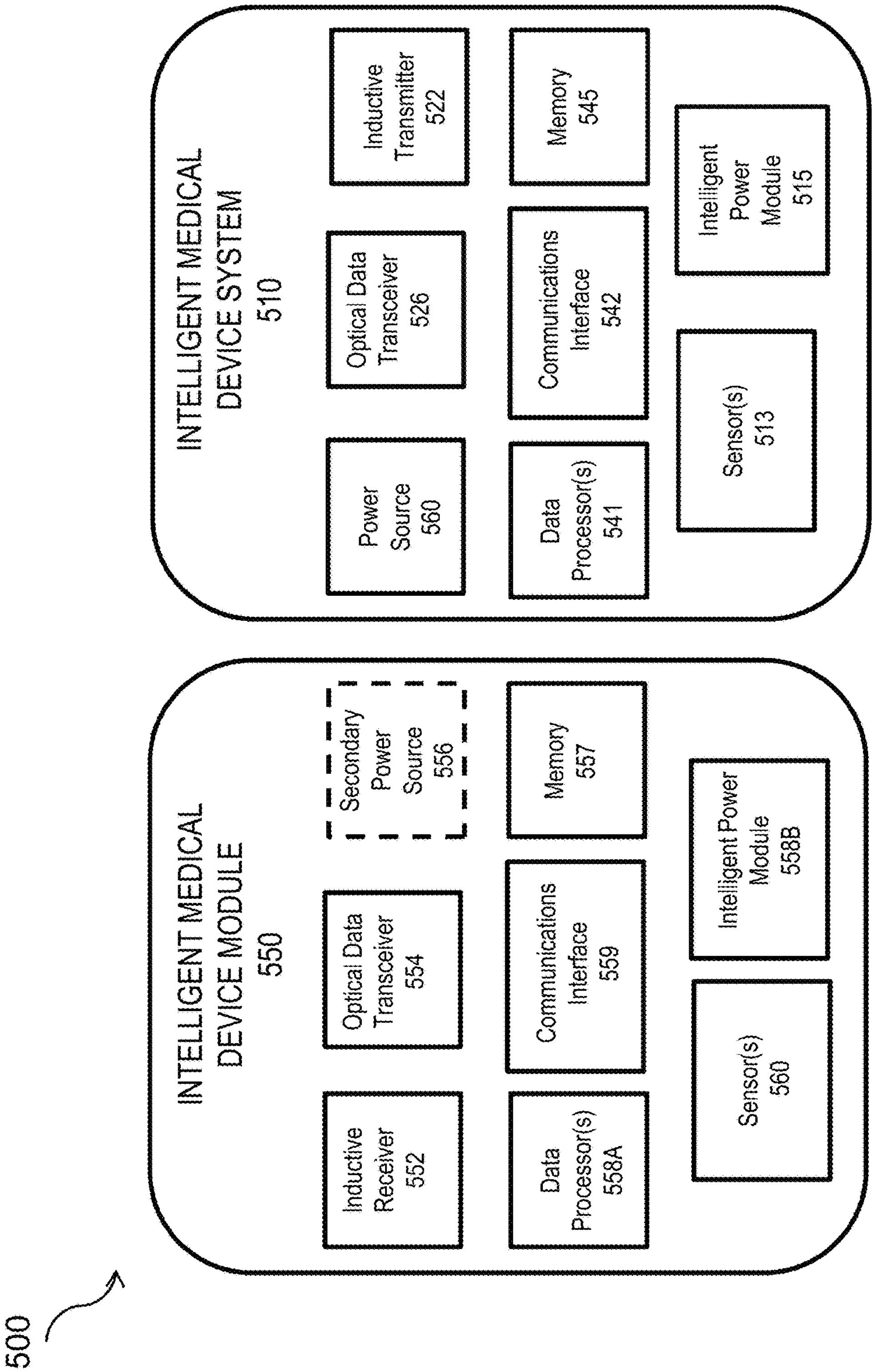
FIG. 5 is a logic diagram illustrating an intelligent inductive power system.

FIG. 5 is a logic diagram 500 of an intelligent inductive power system that can include one or more intelligent medical device modules 550 and an intelligent medical device system 510. The intelligent medical device modules 550 and intelligent medical device system 510 can be included in computing landscape 400.

Each intelligent medical device module 550 can be similar to the medical device module 150 shown in FIGS. 1-3 and can include inductive receiver 552, optical data transceiver 554, data processor(s) 558A, memory 557, communications interface 559, one or more sensors 560, and intelligent power module 558B. The one or more sensors 560 can include, for example, one or more temperature sensors and/or electrical sensors.

Each intelligent medical device module 550 can be inductively powered by intelligent medical device system 510. Intelligent medical device system 510 can have a plurality of mounting seats to which intelligent medical device module 550 can be affixed. Like the mounting seats in modular medical device system 110, each mounting seat in intelligent medical device system 510 can have an inductive transmitter 522. Inductive transmitter 522 can provide non-contact powering of intelligent medical device module 550 via inductive receiver 552 when the intelligent medical device module is affixed to the mounting seat. If inductive receiver 552 is unable to adequately power intelligent medical device module 550, optional secondary power source 556 in intelligent medical device module 550 can provide an alternative source of power to the medical device module.

Memory 557 of the intelligent medical device module 550 can include instructions for execution by the at least one data processor 558A for use in the operation of the intelligent medical device module in a clinical setting. Additionally, memory 557 can also include instructions for execution by the at least one data processor 558A for use in implementing the intelligent power module 558B to monitor, store, and/or transmit one or more parameters/data of inductive receiver 552 to intelligent medical device system 510. The intelligent medical device system 510 can, in turn, store these parameters/data in data storage systems 425. For example, the parameters/data can include one or more of an inductive controller manufacturer ID, a firmware release ID, a link efficiency, a last error code, a device status, an input voltage, an input current, an output power, a temperature, and other sensor data. In some implementations, more than one inductive receiver 552 can be provided, and one or more of the above parameters/data can be provided for each inductive receiver. In some implementations, a communication link to the intelligent medical device system 510 can be provided via a serial bridge to exchange the parameters/data and control values over this bridge. In some implementations, the intelligent power module 558B (e.g. using data processor (s) 558A) can be configured to determine one or more of a link current, efficiency, and temperature operating state of each inductive receiver 552 based upon special instructions and feedback loops to implement these features.

In some implementations, the one or more parameters/data of the intelligent medical device module 550 can be transmitted (e.g. alternatively or in addition to the serial bridge) over the optical data transceiver 554 to intelligent medical device system 510. In some implementations, the one or more parameters/data can be transmitted (e.g. alternative or in addition to the serial bridge and/or the optical data transceiver 554) using a near field magnetic induction communication system via the inductive receiver 552 and the inductive transmitter 522. The one or more parameters/data of the intelligent medical device module 550 can be transmitted in response to one or more queries/interrogations from the intelligent medical device system 510. In some implementations, intelligent medical device module 550 can automatically transmit the one or more parameters/data to intelligent medical device system 510 without waiting for a query/interrogation from the medical device system. For example, intelligent medical device module 550 may be configured to transmit the one or more parameters/data to intelligent medical device system 510 at predetermined time intervals or upon the occurrence of a particular event. These events can occur, for example, when intelligent medical device module 550 is powered on, when intelligent medical device module 550 receives data, and the like.

In some implementations, each intelligent medical device module 550 can also comprise an additional communications interface 559 other than the optical data transceiver 554. Communications interface 559 may be needed in implementations where optical data transceiver 554 is not part of the intelligent medical device module 550. In these implementations, communications interface 559 can be the only gateway for communication outside of the intelligent medical device module 550. The communications interface 559 can be fixed and/or wireless and can be used to communicate to computer networks and peer-to-peer pairing with other devices when the intelligent medical device module 550 is not coupled to the backplane 120. In some implementations, the communications interface 559 can be used in addition or instead of the optical data transceiver 554 when the intelligent medical device module 550 is coupled to the backplane 120. For example, the intelligent medical device module 550 can be seated on the backplane 120 but not have an optical data transceiver. In such a scenario, the communications interface 559 can wirelessly communicate with one or more data processors 541 of the controller of the intelligent medical device system 510 so that the one or more parameters/data can be monitored and/or controlled by the medical device system 510.

The intelligent medical device system 510 can be similar to the modular medical device system 110 shown in FIGS. 1-2, and can include a power source 560, optical data transceiver 526, one or more inductive transmitters 522, data processor(s) 541, communications interface 542, memory 545, one or more sensors 513, and intelligent power module 515. In some implementations, the data processor(s) 541, memory 545, and the intelligent power module 515 may be part of the control unit 140. In some implementations, intelligent medical device system 510 can transmit parameters/data received from intelligent medical device module 550, such as parameters/data from inductive receiver 552, to servers 410 and 415, clients 420, the MCDs 430, other intelligent medical device modules, and other intelligent medical device systems using communications interface 542. In some implementations, intelligent medical device system 510 can save parameters/data received from intelligent medical device module 550 to data storage systems 425.

In some implementations, the intelligent medical device system 510 can include memory 545 which includes instructions for execution by the at least one data processor 541 for use in receiving the one or more parameters/data from each intelligent medical device module 550. The received parameters/data may relate to an inductive receiver 552 in each intelligent medical device module 550, for example.

Memory 545 can also include instructions for execution by data processor 541 to access, receive, or determine one or more parameters/data from inductive transmitter 522. For example, the parameters/data of the inductive transmitter 522 can include an inductive controller manufacturer ID, a firmware release ID, a link efficiency, a last error code, a device status, an input voltage, an input current, an output power, a temperature, and other sensor data. In some implementations, the intelligent power module 515 (e.g. using data processor(s) 541) can be configured to determine one or more of a link current, efficiency, and temperature operating state of each inductive transmitter 522 based upon special instructions and feedback loops to implement these features. In some implementations, intelligent medical device system 510 can transmit the parameters/data of inductive transmitter 522 to servers 410 and 415, clients 420, the MCDs 430, other intelligent medical device modules, and other intelligent medical device systems using communications interface 542. In some implementations, intelligent medical device system 510 can save parameters/data of inductive transmitter 522 to data storage systems 425.

Application server 415 can host a remote maintenance application that allows a user (e.g., maintenance personnel) to remotely conduct maintenance tests on intelligent medical device module 550. Unlike conventional maintenance applications which may require a user to be in the same location as the medical device module when performing maintenance tests, the remote maintenance application allows a user to administer these tests remotely via network 405.

Figure 6:
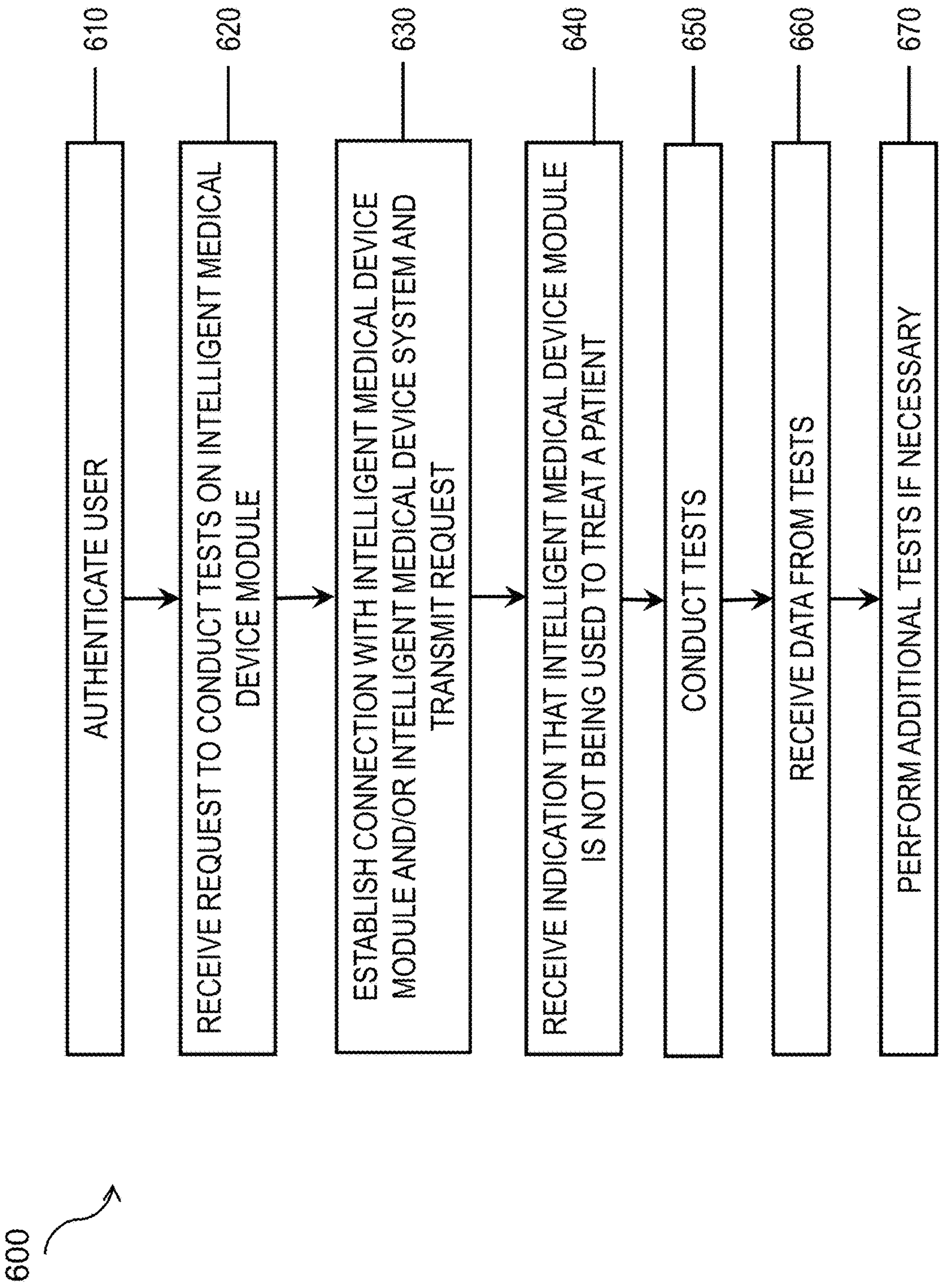
FIG. 6 is a diagram illustrating a process for using a remote maintenance application.

A user, such as a remote technician, can launch the remote maintenance application using any of clients 420 and/or MCDs 430. FIG. 6 illustrates a process 600 for using the remote maintenance application.

At 610, the remote maintenance application can authenticate the identity of the user in order to prevent unauthorized testing of intelligent medical device modules 550. During the authentication process, the remote maintenance application can prompt the user to enter a username and password. The remote maintenance application can cross reference the received authentication information against a list of personnel authorized to use this application. Alternatively or additionally, the remote maintenance application can associate the received authentication information with a role performed by the user. This role can, for example, correspond to the user's title or position. Only users having a specific role may be allowed to use the remote maintenance application. For example, maintenance personnel may be authorized to use the remote maintenance application while laboratory personnel may not. Role information as well as the list of personnel authorized to use the remote maintenance application can be stored at data storage systems 425 or at application server 415.

At 620, the authenticated user can make a request to conduct tests on an intelligent medical device module 550 and/or the mounting seat to which the intelligent medical device module is affixed. This request can be entered into the remote maintenance application. Because computing landscape 400 can include many intelligent medical device modules 550, the user may be prompted to identify the particular intelligent medical device module to be tested. The intelligent medical device module 550 can be identified using, for example, the intelligent medical device module's IP address, the IP address of the intelligent medical device system 510 to which the intelligent medical device module belongs in combination with other identifying information (e.g., the module's mounting seat position), a network name and/or device name, and the like.

The user's request can also identify one or more tests to be conducted on the intelligent medical device module 550 and/or the mounting seat to which it is affixed. These tests can be selected from a predetermined set of maintenance tests that are designed to measure various parameters associated with inductive receiver 552 and/or the inductive transmitter 522. These parameters can include a link efficiency, an input voltage, an input current, an output power, and a temperature. Alternatively or additionally, these tests can measure parameters related to the operation of the intelligent medical device module 550. For example, if intelligent medical device module 550 is an infusion pump, these tests can measure the maximum pressure of the pump, the maximum infusion rate, and the like. While many of these tests can be conducted automatically, some of these tests may require manual assistance from an operator. The request can identify whether the tests require human intervention.

At 630, a call or connection can be established with the intelligent medical device module 550 to be tested. Establishing this call allows client 420 or MCD 430 on which the remote maintenance application is running to exchange information with intelligent medical system 510 and intelligent medical device module 550. In order to establish the call with the correct device, the user can enter the identity of the intelligent medical device module 550 or the intelligent medical device system 510 to which it belongs using the identifying information described above with respect to 620. Alternatively, the remote maintenance application can pull this identifying information from the request received at 620. The remote maintenance application can then use this information to set up the call. Once this call is established, the remote maintenance application can transmit the request to intelligent medical device system 510 which, in turn, can transmit this request to intelligent medical device module 550. In some implementations, the remote maintenance application can directly transmit this request to intelligent medical device module 550.

Before testing can begin, the remote maintenance application can verify that the intelligent medical device module 550 to be tested is not currently being used to treat a patient. This precaution can prevent the unwanted testing of a device while it is being used for clinical purposes. At 640, the remote maintenance application can receive this indication from the intelligent medical device module 550 and/or the intelligent medical device system 510. This indication can be sent, for example, while the intelligent medical device module 550 is in standby mode or if the intelligent medical device module has not experienced a change in operating state during a predetermined period of time. In some implementations, an assistant located at intelligent medical device module 550 can verify that the intelligent medical device module is not being used to treat a patient and send an indication of the same to the remote maintenance application.

At 650, the tests identified in the request can be conducted on the intelligent medical device module 550 or the mounting seat to which it is affixed. As explained above, while many of these tests can be conducted automatically, some tests may require operator assistance. Tests that can be conducted automatically include, for example, the measuring of voltage, temperature, or other sensor data at inductive transmitter 522 and inductive receiver 552 using sensors 513 and sensors 560, respectively. Tests that require operator assistance include, for example, maximum pressure tests on an infusion pump. For these tests, an operator may need to manually pump the device to occlusion before its pressure can be measured by a pressure sensor.

At 660, the remote maintenance application can receive test data based on the tests conducted at 650. The intelligent medical device system 510 to which the intelligent medical device module 550 belongs can transmit this test data to application server 415. Test data can be sent to application server 415 at periodic intervals during testing or in a single message after testing has finished. Application server 415 can, in turn, provide or transmit the test data to the client 420 and/or the MCD 430 running the remote maintenance application. In some implementations, intelligent medical device system 510 can provide or transmit this test data directly to the client 420 and/or the MCD 430. Client 420 and/or the MCD 430 can load, store, or display the test data to the user.

With regard to the test data, the remote maintenance application can vary the amount of detail that is provided to a user based on the user's role. For example, maintenance personnel (i.e., those responsible for maintaining and/or fixing intelligent medical device modules 550) may need access to more detailed test data than laboratory personnel (i.e., those who merely monitor and/or use intelligent medical device modules). While raw test data values can be provided to the former, less detailed test data can be provided to the latter (e.g., changes in data values over time). The remote maintenance application can determine the user's role and, consequently, the type of test data to be provided to the user based on the authentication information received at 610.

The user can analyze the test data provided at 660 to determine whether the tested intelligent medical device module 550 or the mounting seat to which it is affixed is functioning properly. In some implementations, the user can request operational data from the remote maintenance application. Operational data can include data relating to the day-to-day operation of the intelligent medical device module 550 or the mounting seat to which it is affixed and may not include data generated during testing as described herein. The remote maintenance application can retrieve operational data from data storage systems 425 and provide this data to the client 420 and/or MCD 430. In some implementations, the remote maintenance application can be configured to compare the test data with the operational data and identify performance trends from this data.

These trends can reveal a progression over time towards undesirable conditions such as higher operating currents, higher operating temperature, and the like which, in turn can trigger the need for additional tests or maintenance. For example, a motor in an infusion pump may be known to require a certain amount of power to operate the pump. If it is determined that the motor gradually requires more current over time to operate the pump, then a user may want to conduct additional tests at 670. The user can enter a request for additional tests into the remote maintenance application which, in turn, can transmit this request to the intelligent medical device system 510. This request can identify the intelligent medical device module to be tested and the types of tests to be conducted. For example, if the user determines that the motor in an infusion pump is not functioning properly, the user can enter a request into the client 420 and/or MCD 430 running the remote maintenance application. This request can identify the particular infusion pump to be tested as well as the nature of the test (e.g., a test to determine whether the motor needs to be replaced). The remote maintenance application can transmit this request to the infusion pump across networks 405 or 435. In some implementations, intelligent medical device system 510 can receive this request from the remote maintenance application and forward the request to the infusion pump to be tested. The infusion pump can display a message indicating a request for testing. Because this request may require assistance from an operator, the request can indicate whether human intervention is needed. An operator located at the pump can receive this request and replace the infusion pump's motor as indicated in the request.

Figure 7:
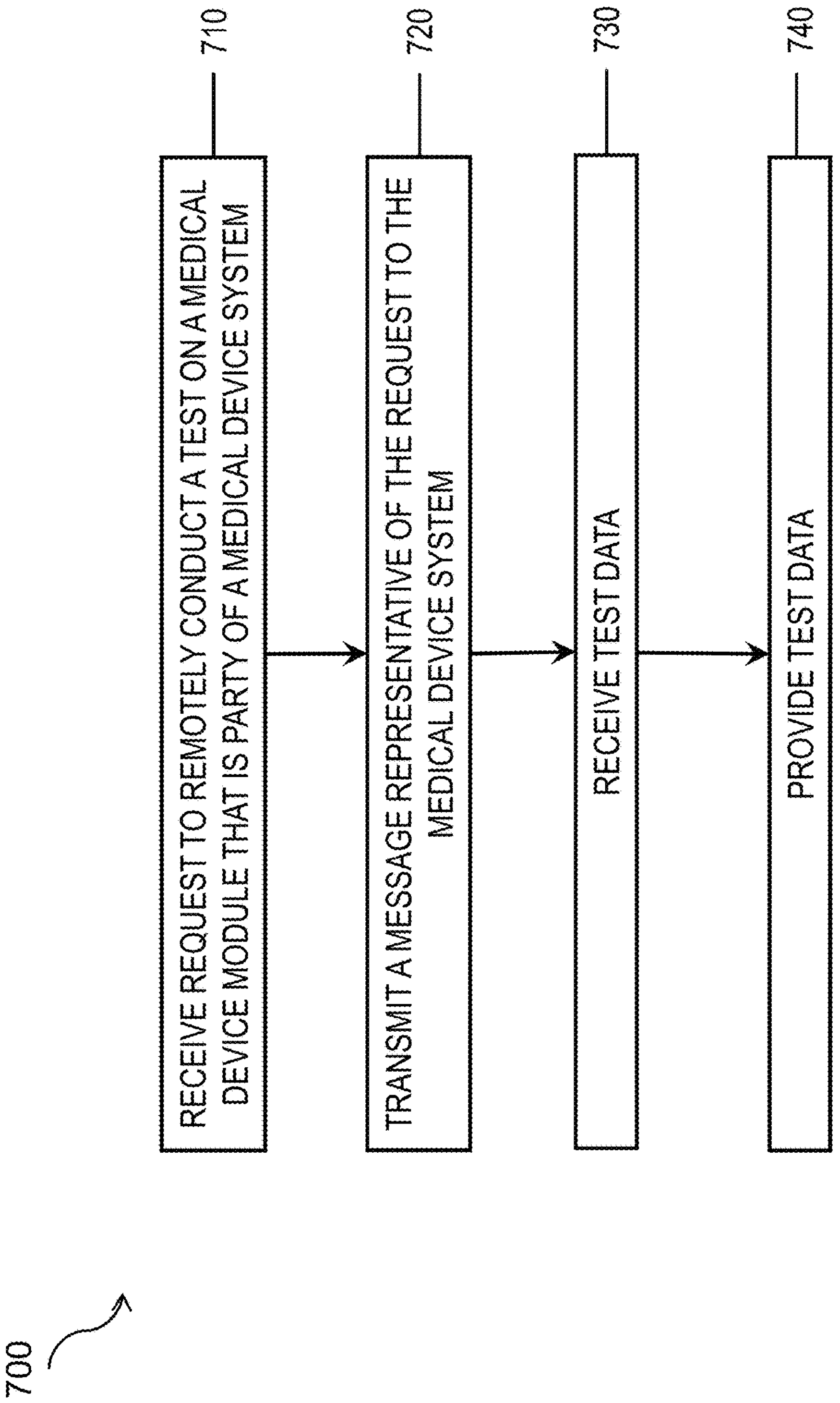
FIG. 7 is a diagram illustrating another process for using a remote maintenance application.

FIG. 7 illustrates a process 700 for using a remote maintenance application. At 710, the remote maintenance application can receive a request to conduct one or more tests on a medical device module that is part of a medical device system. In some implementations, the medical device module can have an inductive receiver and correspond to the intelligent medical device module 550. The medical device system can correspond to the intelligent medical device system 510. The medical device system can include an inductive backplane having a plurality of mounting seats, each mounting seat having an inductive transmitter. The inductive backplane can be configured to inductively power the medical device module when the medical device module is affixed to a first mounting seat. The tests conducted on the medical device module can relate to an attribute of the inductive receiver on the medical device module or the inductive transmitter on the first mounting seat. The tests can also relate to the operation of the medical device module.

At 720, the remote maintenance application can transmit a message representative of the request to the medical device system. This message can identify the medical device module to be tested, the types of test to be conducted, and whether operator assistance is needed.

At 730, the remote maintenance application can receive test data based on the tests conducted on the medical device module and/or the mounting seat to which it is affixed.

At 740, the remote maintenance application can provide the test data to the user by transmitting, loading, storing, or displaying the test data on a client and/or MCD running the remote maintenance application. In some implementations, the remote maintenance application can vary the type of test data that is provided to the user based on the user's role.

The following U.S. patent applications describe infusion pumps and infusion pump mechanisms that can be used in connection with the current subject matter and are all hereby incorporated by reference in their entirety for all purposes: U.S. patent application Ser. No. 13/827,775 entitled "Pump Segment Placement"; U.S. patent application Ser. No. 13/827,036 entitled "Memory and Identification Associated With IV Set"; U.S. patent application Ser. No. 13/828,777 entitled "Cooperation of Platen and Pump Cassette for Pump Device"; U.S. patent application Ser. No. 13/829,425 entitled "Rotary Valve for a Disposable Infusion Set"; U.S. patent application Ser. No. 13/829,854 entitled "Infusion Pump Configured to Engage a Sensor With Tubing"; and U.S. patent application Ser. No. 13/830,175 entitled "IV System to Assist With Line Management".

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

With certain aspects, to provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), the Internet, WiFi (IEEE 802.11 standards), NFC, BLUETOOTH, ZIGBEE, and the like.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A system, comprising:
at least one processor; and
a memory, wherein the at least one processor and the memory are configured to perform operations comprising:
receiving, by the at least one processor and from a proximity sensor coupled to a mounting seat configured to hold therein an infusion pump, an indication of a presence of the infusion pump at the mounting seat, the mounting seat including an inductive transmitter; and
transmitting, by the at least one processor and via the inductive transmitter to the infusion pump held by the mounting seat and having an inductive receiver coupled with the inductive transmitter, a message representative of a request to provide operational parameters related to the infusion pump, wherein receiving the indication of the presence of the infusion pump at the mounting seat initiates the transmission of the message representative of the request to provide operational parameters related to the infusion pump, wherein the operational parameters comprise one or more of a pressure parameter for operation of the infusion pump and an infusion rate of the infusion pump and the operational parameters are stored in a memory of the infusion pump;
receiving, by the at least one processor and from the inductive transmitter, the operational parameters related to the infusion pump; and
determining, by the at least one processor and based on the operational parameters, a status of the infusion pump.

2. The system of claim 1, wherein the operational parameters comprise parameters from the inductive receiver of the infusion pump.

3. The system of claim 2, wherein the parameters from the inductive receiver comprise one or more of a link efficiency, an input voltage, an input current, an output power, and a temperature.

4. The system of claim 1, wherein the operational parameters comprise parameters related to operation of the infusion pump.

5. The system of claim 1, wherein the operations further comprise:
verifying, by the at least one processor, that the infusion pump is not being used to treat a patient, the verifying occurring prior to transmitting the message.

6. The system of claim 1, wherein the system comprises a plurality of mounting seats, the plurality of mounting seats including the mounting seat at which the infusion pump is located and other mounting seats, the other mounting seats configured to hold other medical devices.

7. The system of claim 1, wherein the system includes the infusion pump.

8. The system of claim 1, wherein the operations further comprise:
receiving, by the at least one processor and from a remote application server, the request to provide the operational parameters related to the infusion pump.

9. The system of claim 1, wherein the operational parameters are received based on the request.

10. The system of claim 1, wherein the operational parameters comprises patient data, medication administration data, and/or patient treatment parameters.

11. A method, comprising:
receiving, by at least one processor and from a proximity sensor coupled to a mounting seat configured to hold therein an infusion pump, an indication of a presence of the infusion pump at the mounting seat, the mounting seat including an inductive transmitter; and
transmitting, by the at least one processor and via the inductive transmitter to the infusion pump held by the mounting seat and having an inductive receiver coupled with-the inductive transmitter, a message representative of a request to provide operational parameters related to the infusion pump, wherein receiving the indication of the presence of the infusion pump at the mounting seat initiates the transmission of the message representative of the request to provide operational parameters related to the infusion pump, wherein the operational parameters comprise one or more of a pressure parameter for operation of the infusion pump and an infusion rate of the infusion pump and the operational parameters are stored in a memory of the infusion pump;
receiving, by the at least one processor and from the inductive transmitter, the operational parameters related to the infusion pump; and
determining, by the at least one processor and based on the operational parameters, a status of the infusion pump.

12. The method of claim 11, wherein the operational parameters comprise parameters from the inductive receiver of the infusion pump.

13. The method of claim 12, wherein the parameters from the inductive receiver comprise one or more of a link efficiency, an input voltage, an input current, an output power, and a temperature.

14. The method of claim 11, wherein the operational parameters comprise parameters related to operation of the infusion pump.

15. The method of claim 11, further comprising:
verifying, by the at least one processor, that the infusion pump is not being used to treat a patient, the verifying occurring prior to transmitting the message.

16. The method of claim 11, wherein the operational parameters are received based on the request.

17. The method of claim 16, wherein the operational parameters received based on the request include one or more of a pressure and an infusion rate of the infusion pump.

18. The method of claim 11, further comprising:
receiving, by the at least one processor and from a remote application server, the request to provide the operational parameters related to the infusion pump.

19. A non-transitory computer-readable medium containing instructions to configure a processor to perform operations comprising:
receiving, by the processor and from a proximity sensor coupled to a mounting seat configured to hold therein an infusion pump, an indication of a presence of the infusion pump at the mounting seat, the mounting seat including an inductive transmitter; and
transmitting, by the processor and via the inductive transmitter to the infusion pump held by the mounting seat and having an inductive receiver coupled with the inductive transmitter, a message representative of a request to provide operational parameters related to the infusion pump, wherein receiving the indication of the presence of the infusion pump at the mounting seat initiates the transmission of the message representative of the request to provide operational parameters related to the infusion pump, wherein the operational parameters comprise at least one of a pressure parameter for operation of the infusion pump and an infusion rate of the infusion pump and the operational parameters are stored in a memory of the infusion pump;

receiving, by the processor and from the inductive transmitter, the operational parameters related to the infusion pump; and determining, by the processor and based on the operational parameters, a status of the infusion pump.

* * * * *